Dec. 23, 1958 R. E. BLANCO ET AL 2,865,737
METHOD OF PURIFYING URANIUM METAL
Filed June 4, 1957
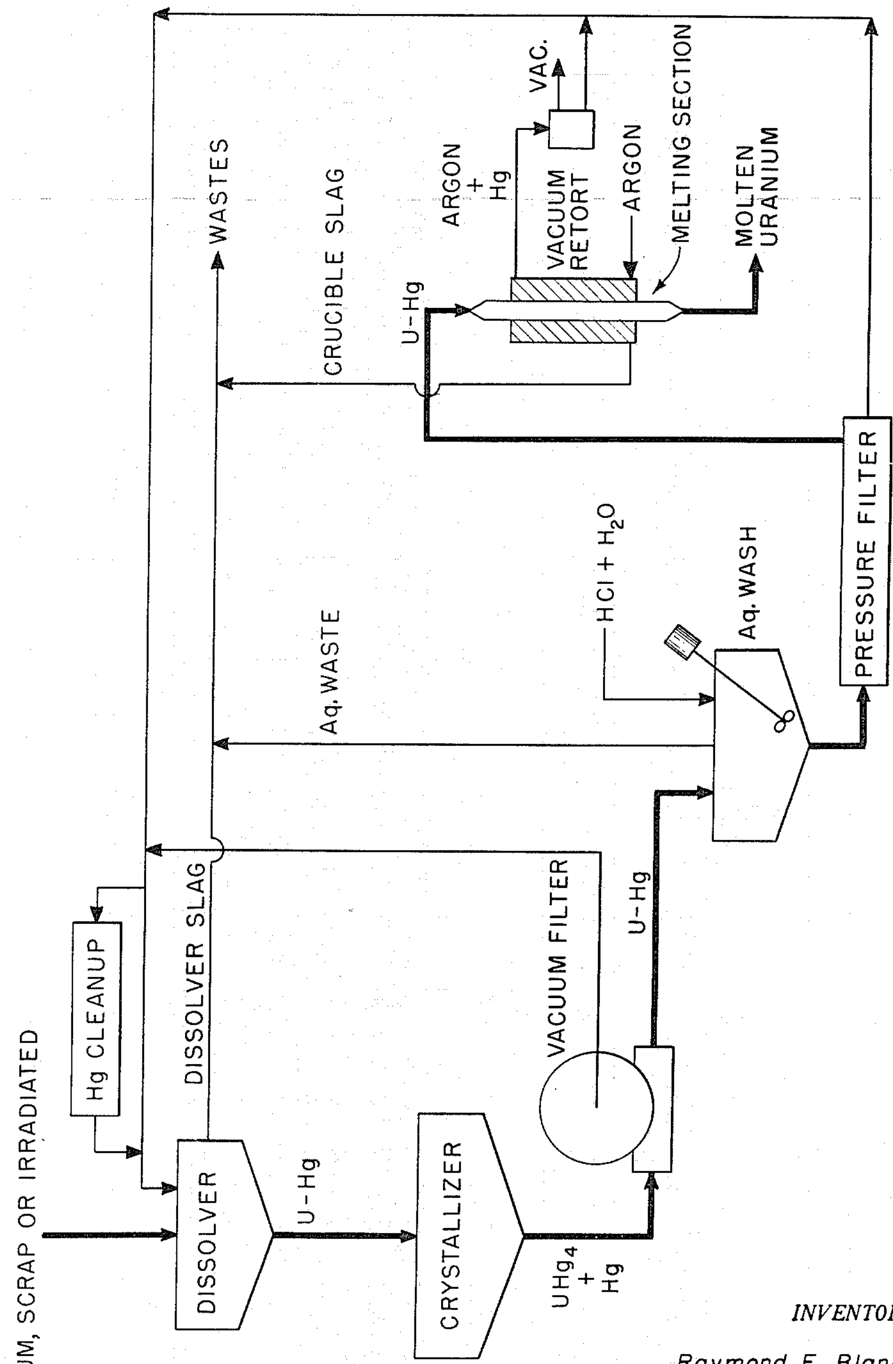
*INVENTORS*
*BY* Raymond E. Blanco
Bruce H. Morrison
Roland A. Anderson
ATTORNEY United States Patent Office 2,865,737

Patented Dec. 23, 1958

1

2,865,737

METHOD OF PURIFYING URANIUM METAL

Raymond Eugene Blanco, Oak Ridge, Tenn., and Bruce H. Morrison, Los Alamos, N. Mex., assignors to the United States of America as represented by the United States Atomic Energy Commission Application June 4, 1957, Serial No. 663,555

5 Claims. (Cl. 75—84.1)

Our invention relates to a method of purifying metals. More particularly our invention relates to a method for purifying and decontaminating uranium metal.

The recovery of metallic uranium from contaminated sources is essential to the economic operation of a nuclear energy program. Two such sources are scrap resulting from machining and working uranium and irradiated reactor fuel. Metallic uranium may be employed as fuel in various types of nuclear reactors, one example of which is disclosed in U. S. Patent No. 2,736,696. The uranium becomes contaminated with highly radioactive fission products resulting from the fission of uranium in the reactor. Because of the intense radioactivity long cooling periods have been required before spent uranium fuel elements could be safely processed.

Various purification and recovery processes for metallic uranium have been employed in the prior art, including aqueous and pyrometallurgical processes. Aqueous processes, particularly solvent extraction, have been effectively used to decontaminate metallic uranium, but several disadvantages are presented. The uranium is not maintained in the metallic state, and extensive additional processing steps are required to prepare uranium metal from the salts resulting from aqueous processing. In addition the solvents and extractants employed in aqueous processes are not entirely stable in the presence of intense radiation.

Pyrometallurgical processes have been employed only to a limited extent in purifying uranium because of their disadvantages. Excessively high temperatures are required in the decontamination step, and purification factors have not been as high as desirable.

An object of our invention, therefore, is to provide a method for the purification of metallic uranium in which the uranium is maintained in the metallic state.

Another object is to provide a relatively low temperature method for decontaminating metallic uranium.

Another object is to provide a method for decontaminating metallic uranium wherein the media employed are stable in the presence of intense radiation.

Another object is to provide a continuous process for decontaminating metallic uranium.

Other objects and advantages of our invention will become apparent from the following detailed description and the claims appended hereto.

In accordance with our invention impure uranium metal may be purified by dissolving the metal in mercury at a temperature over 300° C., separating the resultant slag and recovering uranium from the resulting amalgam. Additional decontamination may be obtained by including the steps of washing the amalgam with a dilute acid solution and heating the amalgam to the melting point of uranium, thus volatilizing the mercury and forming additional slag which may be separated from the molten uranium.

The method of our invention combines the advantages of solvent extraction processing, namely, low temperatures and adaptability to continuous operation, with those of pyrometallurgical processing, i. e., the use of radiation resistant processing media and retention of the metal in the metallic state. The final high temperature recovery step is carried out at low levels of radioactivity, thereby reducing the complexity of maintenance and the necessity for remote operation. Even in the high-activity step, the mercury, itself a shield, reduces shielding requirements. Because there are two purification means, i. e., oxide slagging and differential solubility, high decontamination factors may be obtained. Another advantage is that neither the mercury liquid nor the vapor is corrosive to readily available material of construction such as stainless steel at preferred temperatures.

Although our invention is to be illustrated with metallic uranium, it is to be understood that the method may also be used for uranium alloyed with other metals.

The figure illustrates a general flow diagram for the uranium purification method of this invention.

The method of our invention is based on the solubility of uranium in mercury at temperatures above 300°. At lower temperatures the solubility and dissolution rate of uranium in mercury are impractically low for this method. The feasibility of this method was indicated by our studies of dissolution rates. Uranium samples, $\frac{3}{16}$ in. long by 1 in. in diameter were boiled in 150 ml. of mercury for 30 minutes under an argon atmosphere. Two samples of unirradiated uranium dissolved at rates of 12 and 17 mg./cm.$^2$/min., and two irradiated samples dissolved at rates of 7 and 9 mg./cm.$^2$/min. Although temperatures up to 650° C. may be employed, we prefer to dissolve the uranium in mercury at a temperature near the boiling point of mercury (356° C.). Uranium is more soluble at higher temperatures, but mercury becomes corrosive. The upper temperature limit of our method may thus be determined by the corrosion resistance of the apparatus employed.

Various concentrations of uranium in the mercury solution may be used in our method. Although our invention is not to be understood as so limited, we prefer to use a continuous process, dissolving approximately 0.2 to 1.0 wt. percent uranium in the mercury. Although the concentration of uranium in mercury can be increased above that range, we prefer to operate our process within that concentration range, because of the rapid dissolution rate of uranium at the lower concentrations.

Although various types of dissolvers, including Pyrex vessels, may be employed we prefer to use a stainless steel vessel in order to eliminate damage to the equipment by the reagents. Although not essential to our method, it is preferred to carry on the dissolution step under an inert atmosphere. This may be accomplished by the use of an inert gas such as argon. An inert atmosphere reduces losses of uranium caused by the formation of uranium oxides, which tend to become mixed with the slag impurities.

A layer of slag which contains the majority of the impurities originally present with the uranium forms in the dissolver upon dissolution of the uranium. The slag may be separated from the uranium-mercury solution by any conventional means, but we prefer to use a filter. Since uranium-mercuride compounds form and crystallize at lower temperatures, the solution is filtered while still hot.

After the slag has been removed, the remaining uranium-mercury solution is cooled to a temperature substantially below the point at which uranium-mercuride compounds form. We prefer to cool the uranium mercury solution to a temperature from approximately 20° C. to 30° C. When the solution has been cooled, the bulk of the liquid mercury may then be separated from the solid uranium-mercuride solids and recycled to the dissolver. We prefer to concentrate the uranium-mercury mass in this manner to a uranium concentration of approximately 5%, and this may suitably be done by vacuum filtration. Other means, such as centrifuging may also be employed for this step.

If desired a further concentration of the uranium by means such as a pressure filter may be effected before further processing. We have found that the concentration of the uranium may thus be increased to as high as 15%. The mercury removed may be recycled in the same manner as the mercury removed in the first concentration step.

A minor proportion of impurities, and especially fission product impurities when processing irradiated uranium, are removed in the foregoing concentration steps. The removal of fission product impurities in these steps is due to the higher solubility of the impurities than uranium in mercury at the low temperatures. In order to recycle the mercury, a mercury cleaning step, such as distilling the mercury, may be employed before returning the mercury to the dissolver.

Uranium is recovered from the uranium-mercury mass in our invention by heating the mass to the melting point of uranium, thus volatilizing the mercury. Although not essential, an inert atmosphere such as the provision of a vacuum or an atmosphere of an inert gas such as argon is preferred in order to eliminate oxidation of the uranium. A slag layer containing additional impurities may be formed on the molten uranium. This slag may be removed by any conventional means such as by pickling the uranium in a dilute nitric acid solution. Continuous operation of the mercury removal furnace may be effected by continuously feeding the uranium mercury mass into the top of a high temperature furnace. As the temperature of the mass increases the mercury is volatilized, separated from the argon, and recycled. The uranium melts and is removed at the bottom. A batch type mercury removal step may also be used within the scope of our invention.

If additional purification is desired, the uranium-mercuride mass may be washed before being placed in the furnace. Suitable washing reagents are water or dilute solutions of aqueous mineral acids. The washing reagent to be selected may be determined by the kind of impurities present. For instance, when fission products are present, we prefer to use a dilute HCl solution and have found 1 N HCl to be satisfactory. The wash removes additional impurities and its effectiveness is believed to be due to an oxidative effect on fission products and mechanical removal of entrained slag particles. We have found that as much as 6% of the fission products originally present as impurities in the uranium may be removed by a wash step.

Our invention may be employed to reduce the radioactivity of freshly irradiated uranium without cooling the uranium for long periods of time. Although the decontamination obtained with freshly irradiated uranium is not as effective as with cooled uranium, the radiation level may be reduced sufficiently to allow the uranium to be further processed by other methods, such as solvent extraction. A plurality of mercury dissolution steps may also be used to increase decontamination of freshly irradiated uranium.

The following examples are offered to illustrate our process in more detail.

EXAMPLE I

A 50 gram sample of unirradiated uranium, 3/16 in. long and 1 in. in diameter, was placed in 150 ml. of boiling mercury (356° C.). An argon atmosphere was used to minimize oxidation. The rate of dissolution was 17 mg. U/cm.$^2$/min. After approximately 30 minutes, 140 ml. of mercury, containing 0.2 wt. percent uranium, was transferred to a filter where it was allowed to cool to 25° C. A fresh portion of mercury was added to the dissolver from a reservoir.

After cooling, the semi-solid uranium mercuride, which formed a suspension in the mercury phase, was recovered quantitatively by filtration. The mercury filtrate, containing about 10 p. p. m. uranium, was recycled to the mercury reservoir. The butter-like uranium-mercuride mercury mass, containing approximately 3 wt. percent uranium (about 5.8 g. of dissolved uranium), was retained on the sintered glass filter. The dissolution-filtration cycle was repeated a sufficient number of times to provide about 20 g. of dissolved uranium for subsequent operations.

The accumulated uranium-mercuride mercury mass on the filter was washed with five 100 ml. portions of 1 N HCl, at 25° C., and was dried with methanol. This washing was sufficient to remove all visible particles of oxide. The washed mass was then transferred into a fused alumina crucible which was subsequently suspended in a resistance furnace. The furnace was continuously flushed with purified argon and the temperature thereof was gradually increased to 1250° C. The mercury was boiled off during this operation and was collected in a condenser for subsequent recycle. The uranium remained in the crucible and was recovered as a button when the furnace was cooled. The mercury contained only 1 p. p. m. uranium, and the uranium product contained only 10 p. p. m. mercury.

EXAMPLE II

Sections of a three-year cooled uranium slug from the Graphite Reactor at the Oak Ridge National Laboratory were dissolved in the same manner as that described in Example I. Similarly, the uranium-mercuride mercury mass was recovered, washed, and the uranium obtained as a metal button. The distribution of the gross activity of the uranium was investigated and it was determined that about 86% of the activity remained in a slag formed in the dissolver. Approximately 6% of the gross activity was removed in the HCl wash and another 1% was removed as slag in the crucible. The degree of decontamination was determined and specific decontamination factors are given in the following table.

*Table I*

DECONTAMINATION OF IRRADIATED URANIUM

| Activity | Initial U, c./min./g.U | Decontaminated U, c./min./g.U | Decontamination Factor |
|---|---|---|---|
| Gross $\gamma$ | $3.7\times10^7$ | $1.7\times10^5$ | 220 |
| Gross $\beta$ | $2.7\times10^7$ | $6.5\times10^4$ | 410 |
| Cs $\beta$ | $9.2\times10^6$ | $3.3\times10^3$ | 2,800 |
| Sr $\beta$ | $3.0\times10^6$ | $2.8\times10^3$ | 1,100 |
| Total Rare Earths $\beta$ | $1.2\times10^7$ | $1.5\times10^4$ | 800 |
| Zr $\gamma$ | $5\times10^4$ | $2\times10^3$ | 10 |
| Nb $\gamma$ | $1\times10^4$ | $8\times10^3$ | 25 |
| Ru $\beta$ | $2.7\times10^4$ | $2.6\times10^4$ | ---------- |
| Pu $\alpha$ | $1.3\times10^6$ | $2.9\times10^5$ | 7 |

Although the decontamination factors for ruthenium, zirconium, and niobium are low, this is not considered significant in view of their low activities in the initial sample.

Our process will separate uranium metal from all fission products as well as from other elements commonly employed in reactor fuels such as zirconium, aluminum, niobium, molybdenum and iron.

The above examples are only illustrative and should not be construed as limiting the scope of our invention. Only such limitations should be imposed on the scope of our invention as are indicated in the appended claims.

Having thus described our invention, we claim:

1. A process for the segregation and recovery of uranium metal from a mixture containing said uranium metal together with extraneous impurities which comprises contacting said mixture with liquid mercury at a temperature of at least approximately 300° C., whereby a reaction mass containing a uranium-mercury solution and an impurity-containing slag are formed, separating said uranium-mercury solution from said slag, cooling the separated uranium-mercury solution to a temperature substantially below the point at which uranium-mercuride solids form in a liquid mercury phase, removing a substantial amount of said liquid mercury from said solids, and recovering metallic uranium from said solids.

2. A process for the segregation and recovery of uranium metal from a mixture containing said uranium metal together with extraneous impurities which comprises contacting said mixture with liquid mercury in an inert atmosphere at a temperature of at least approximately 300° C., whereby a reaction mass containing a uranium mercury solution and an impurity-containing slag are formed, separating said uranium-mercury solution from said slag, cooling the separated uranium-mercury solution to a temperature substantially below the point at which uranium-mercuride solids form in a liquid mercury phase, removing a substantial amount of said liquid mercury from said solids, heating the remaining uranium-mercuride solids in an inert atmosphere to a temperature at least as high as the melting point of uranium, and recovering the resulting uranium metal.

3. The process of claim 2 wherein the uranium-mercuride solids are washed before said solids are heated.

4. The process of claim 3 wherein the uranium-mercuride solids are washed with an aqueous solution of HCl.

5. A process for the segregation and recovery of uranium metal from a mixture containing irradiated uranium metal together with fission products which comprises contacting said mixture with liquid mercury in an inert atmosphere at a temperature of at least approximately 350° C., whereby a reaction mass containing a uranium-mercury solution and a slag containing fission products are formed, separating said uranium-mercury solution from said slag, cooling the separated solution to a temperature substantially below the point at which uranium-mercuride solids form in a liquid mercury phase, removing a substantial amount of said liquid mercury from said solids, washing the remaining uranium-mercuride solids with an aqueous solution of HCl, heating the washed solids in an inert atmosphere to a temperature at least as high as the melting point of uranium whereby massive uranium metal and an impurity-containing slag are formed, and separating the said uranium metal from said impurity-containing slag.

References Cited in the file of this patent

FOREIGN PATENTS 536,258 Great Britain ------------ May 8, 1941

OTHER REFERENCES

"The Chemistry of Uranium," by Katz and Rabonowitch, part I, pp. 175, 177 (1951).